United States Patent Office 3,758,369
Patented Sept. 11, 1973

3,758,369
RESISTANCE AND MODULUS REINFORCING
MATERIALS
Michel Jacques Marie Sindzingre, Cachan, Michel Villamayor, Fontenay-aux-Roses, and Alain Robert, Morsang-sur-Orge, France, assignors to Association pour la Recherche et le Developpement des Methodes et Processus Industriels A.R.M.I.N.E.S., Paris, France
No Drawing. Filed Feb. 23, 1971, Ser. No. 118,187
Int. Cl. B32b 5/16
U.S. Cl. 161—60
4 Claims

ABSTRACT OF THE DISCLOSURE

This invention relates to new composite materials having, along a director plane, noteworthy mechanical properties, wherein they comprise a resistant material, in flat form disposed parallel to the director plane and flakes or bands or substantially flat form, constituted of or comprising a material with high modulus, said flakes or bands also being disposed parallel to the director plane.

---

The present invention relates to new composite materials having, along a director plane, a high breaking strength and a high modulus.

It is known to produce composite materials having high specific properties along a preferred direction by incorporating fibers having a high modulus of elasticity in a simple or composite matrix that may have a high tensile strength.

The invention relates to new composite materials having, along a director plane, particularly high mechanical properties, wherein said materials comprise a resistant material, in sheets, disposed parallel to the director plane and substantially flat flakes or bands made of a material with a high modulus, said flakes or bands also being disposed parallel to the director plane.

The materials according to the invention may also comprise at least one material forming a matrix capable of ensuring a good cohesion between the resistant materials with high modulus.

As resistant material, in substantially flat sheets, use is preferably made of sheets of steel, titanium or alloys based on nickel, whose thickness may vary from $1\mu$ to about 1 mm. The sheets of steel, preferably steel of the maraging type, may, in the composite material, be in the form of continuous sheets or in the form of discontinuous plates of relatively reduced dimensions. The essential point is that they are disposed parallel to the selected director plane. These steel or titanium sheets may possibly be coated superficially, before being used in the complex materials according to the invention, with a material capable of acting as matrix, such as for example a resin, an alloy or a light metal of the aluminium or magnesium type.

The modulus reinforcing material may be constituted of:

(a) Flakes of elements such as boron, silicon carbide, titanium diboride, aluminium or magnesium diboride.

These flakes may be used in the crude state, in which case they are distributed as uniformly as possible on a metal or plastic sheet constituting the matrix or directly on the resistance reinforcing material.

(b) Continuous or non-continuous bands coated on one side or on both sides with a film of thickness between 1 and $500\mu$ of light elements with a very high modulus such as silicon carbide, boron, boron carbide, titanium diboride, etc. generally of compounds of light elements. It is known to prepare such coated bands. In fact, for the silicon carbide or boron coating, the technique of *deposit* *in vapour phase* may be used for example, the band then being constituted in general by a refractory metal such as tungsten, tantalum, molybdenum ... of small thickness (thickness smaller than $50\mu$). This band is heated in a reactor in the presence of adequate gases. Techniques of *evaporation in vacuo* may also be used. The element to be evaporated, such as boron or boron carbide, is contained in a crucible and taken to very high temperature. During evaporation, it is deposited on a continuous or non-continuous ribbon of the matrix material or directly on the resistance reinforcing material.

The composite material is then constituted by the superposition of resistance reinforcing materials and of modulus reinforcing product. These two elements may or may not be separated by a third matrix material whose aim, in certain applications, is to limit the fragility and to ensure the cohesion of the whole. This matrix may be constituted by a resin or a metal or alloy such as magnesium, aluminium, and generally all materials of low density.

The superposition of these different types of materials may be regular, the resistance reinforcing materials alternating with the modulus reinforcing products, separated or not by a matrix material. The regularity of this alternance is not absolutely necessary and, for considerations of specific volumetric fractions of each of the uses, a plurality of layers of modulus reinforcing material may be superposed without separation. The invention relates to all the possible modes of superposing the three elements: resistance reinforcing elements, modulus reinforcing elements and matrix.

Of course, the resistant materials and the materials with high modulus used according to the invention, although they generally have a flat structure, may be in the physical form which gives them improved properties, such as for example in the corrugated form.

However, it has appeared that, according to the invention, a certain number of composite materials had especially advantageous properties. Such materials are characterised on the one hand by the choice of the basic elements which compose them and on the other hand by the conditions under which they are prepared, which conditions permit the development of beneficial interactions between a certain number of constituents of said materials.

These noteworthy composite materials are:

(1) The composite materials in which the matrix is constituted by titanium and the reinforcing elements by flakes or bands whose surface is made of silicon carbide; in the case of the reinforcing material being constituted of bands with silicon carbide surface, said bands are formed by depositing silicon carbide on a molybdenum or preferably titanium core, said deposit being effected by high temperature reaction of a gaseous mixture comprising a silane, a saturated hydrocarbon and hydrogen.

(2) The composite materials in which the matrix is made of aluminium and the reinforcing elements are flakes or bands whose surface is boron or made of boron-rich compounds.

In these two types of composite materials according to the invention, it seems in fact that by using particular conditions of preparation, a beneficial interaction is effected between the matrix and the material forming the surface of the reinforcing element. These conditions of preparation must therefore aim at producing such interactions.

Where the matrix is made of titanium and the surface of the reinforcing material is made of silicon carbide, the various materials that are suitably disposed (flat orientation according to the invention) will be pressed at a temperature of about 900° C. under a pressure of about 4 kg./mm.² for a sufficient duration for the interaction between the titanium and silicon carbide (with formation of various materials such as titanium carbide and titanium silicide) to develop.

The present means for investigation only enable such an interaction to be detected with certitude, in this particular case, when the process of interaction has a thickness of at least 1μ. It is known that a process of interaction of the same type is also developed when the reinforcement of a titanium matrix is effected with the aid of fibres whose surface is made of silicon carbide. However, there is a basic difference between the reinforcement of titanium by fibres with silicon carbide surface and by flakes or bands with silicon carbide surface. In fact, it has been demonstrated that by using the reinforcement by fibres, the interaction between the titanium and the silicon carbide was prejudicial for the final material as soon as such an interaction was detectable, i.e. as soon as its thickness was equal to 1μ. In the case of a reinforcement by flakes or bands with silicon carbide surface, such an interaction, even of thickness at least equal to 1μ, i.e. detectable, is beneficial.

Where the matrix is made of aluminium and the surface of the reinforcing material is made of boron or boron-rich compounds, the two materials will be pressed under a pressure of about 3 kg./mm.² and at a temperature of 580° C. ±10° C. for a duration of the order of 1 hour to 1½ hours, so that a layer of aluminium diboride ($AlB_2$) is produced which must be of the order of a few fractions of microns.

The following non-limiting examples illustrate the invention; in these examples, the following properties have been given for the composite material obtained; the density ($d$), tensile strength (R) and the modulus of elasticity (E), these latter two properties being measured in a direction parallel to the director plane.

EXAMPLE 1

Composite materials are produced which are constituted of a resistance reinforcing element made of maraging steel, a modulus reinforcing element obtained by flakes of aluminium diboride deposited on a sheet of resin and a matrix made of aluminium. For the same volumic fractions as previously, $d = 4.2$
$R = 130$ kg./mm.²
$E = 22,000$ kg./mm.²

EXAMPLE 2

Composite materials are produced which are constituted of a resistance reinforcing element made of eutectoid steel with 0.8% carbon, a modulus reinforcing element made of silicon carbide deposited on a tungsten ribbon, a magnesium matrix. For the same volumic fractions as previously, $d = 4.6$
$R = 140$ kg./mm.²
$E = 26,000$ kg./mm.²

EXAMPLE 3

Composite materials are produced which are constituted by an aluminium matrix and reinforcing elements which are flakes of aluminium dibrodie by coating said flakes, suitably placed between flat aluminium sheets, by means of aluminium. This coating, without apparent chemical reaction on the interface of the materials, is obtained by pressing said materials at a temperature of the order of 630° C.

EXAMPLE 4

A composite material is produced which is constituted by a titanium matrix and a reinforcing element constituted by a band obtained by depositing silicon carbide on titanium. These two constituents are suitably disposed and subjected to a pressure of 4 kg./mm.², at a temperature of about 900° C. for a prolonged duration.

The materials obtained have respectively:
for a $V_f = 50\%$ a modulus (E) of 25,000 kg./mm.² and a density of 3.6;
for a $V_f = 80\%$ a modulus of 34,000 kg./mm.² and a density of 3.3, $V_f$ being the volumic fraction (the percentage in volume) of the reinforcing element (possible substrate include in the complex material in question.

EXAMPLE 5

A composite material is produced which is constituted by an aluminium matrix and a reinforcing element constituted by boron flakes. After being placed in position, the whole is heated under a pressure of 3 kg./mm.² to a temperature of 590° C. for 1½ hours. A material has been been obtained having noteworthy properties in which an intermediate material ($AlB_2$) appears, coming from the interaction between the aluminium and boron.

Of course, the composite materials such as described in Examples 3 and 5 will also have to comprise a resistance reinforcing material as defined hereinabove, as the aluminium has a mechanical resistance which is generally considered to be low.

What is claimed is:

1. A composite material having improved mechanical properties comprising, a resistant material, a reinforcing material with high modulus and a matrix material, said resistant material is flat, disposed parallel to a director plane and is selected from the group consisting essentially of steel, titanium, nickel and alloys thereof, said high modulus reinforcing material is selected from the group consisting essentially of boron, silicon carbide, titanium boride, aluminium diboride and magnesium diboride, said high modulus reinforcing material being in the form of flakes or bands and disposed parallel to the director plane.

2. The composite material as defined in claim 1, wherein the matrix is of a material which provides good cohesion between the resistant material and the high modulus material.

3. The composite material as defined in claim 1, wherein the resistant material is titanium, the reinforcing high modulus material is silicon carbide flakes, said composite material is prepared so that a physicochemical interaction develops between the titanium and the silicon carbide.

4. The composite material as defined in claim 1, wherein the resistant material is titanium, the reinforcing material is a band comprising a silicon carbide surface and a core selected from the group consisting essentially of molybdenum and titanium, said composite material is prepared so that a physicochemical interaction develops between the titanium of the resistant material and the silicon carbide.

References Cited
UNITED STATES PATENTS

| | | | |
|---|---|---|---|
| 3,165,864 | 1/1965 | Shulze | 161—182 X |
| 3,450,510 | 6/1969 | Calow | 264—108 X |
| 3,187,502 | 6/1965 | Stover | 161—182 X |
| 3,492,197 | 1/1970 | Olstowski et al. | 264—29 X |
| 3,372,105 | 3/1968 | Johnson | 161—182 X |
| 3,481,825 | 12/1969 | Darrow | 161—188 |

WILLIAM A. POWELL, Primary Examiner

U.S. Cl. X.R.

161—162, 168, 188